United States Patent
Chiu et al.

(10) Patent No.: US 7,627,831 B2
(45) Date of Patent: Dec. 1, 2009

(54) INTERACTIVE TECHNIQUES FOR ORGANIZING AND RETRIEVING THUMBNAILS AND NOTES ON LARGE DISPLAYS

(75) Inventors: Patrick Chiu, Menlo Park, CA (US); Xiaohua Sun, Cambridge, MA (US); Jeffrey Huang, Concord, MA (US); Maribeth J. Back, Woodside, CA (US); Wolfgang H. Polak, Sunnyvale, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 369 days.

(21) Appl. No.: 11/437,561

(22) Filed: May 19, 2006

(65) Prior Publication Data
US 2007/0271524 A1 Nov. 22, 2007

(51) Int. Cl.
*G06F 3/048* (2006.01)
(52) U.S. Cl. .................. 715/767; 715/769; 715/770; 715/785
(58) Field of Classification Search ........... 715/767, 715/769
See application file for complete search history.

(56) References Cited

U.S. PATENT DOCUMENTS

| | | | | |
|---|---|---|---|---|
| 6,212,512 | B1 * | 4/2001 | Barney et al. ............ | 707/1 |
| 6,523,048 | B2 * | 2/2003 | DeStefano ............... | 715/234 |
| 6,642,944 | B2 * | 11/2003 | Conrad et al. ............ | 715/781 |
| 6,915,490 | B1 * | 7/2005 | Ewing .................... | 715/794 |
| 7,231,609 | B2 * | 6/2007 | Baudisch ................. | 715/769 |
| 7,315,985 | B1 * | 1/2008 | Gauvin et al. ............ | 715/734 |
| 2008/0077874 | A1 * | 3/2008 | Garbow et al. ........... | 715/764 |

OTHER PUBLICATIONS

Baldonado, et al., "SenseMaker: An Information-Exploration Interface Supporting the Contextual Evolution of a User's Interest," *Proc. of CHI '97*, pp. 11-18 (1997).
Baudisch, et al., "Drag-and-Pop and Drag-and-Pick: Techniques for Accessing Remote Screen Content on Touch- and Pen-operated Systems," *Proc. Interact '03*, pp. 57-64 (2003).
Collomb, et al., "Improving Drag-and-Drop on Wall-Size Displays," *In Proc. of GI 2005*, May 2005, pp. 25-32 (2005).
Cutting, et al., "Scatter/Gather: A Cluster-based Approach to Browsing Large Document Collections," *Proc. of SIGIR '92*, pp. 318-329 (1992).

(Continued)

*Primary Examiner*—William L Bashore
*Assistant Examiner*—David Phantana-angkool
(74) *Attorney, Agent, or Firm*—Fliesler Meyer LLP

(57) ABSTRACT

The present invention relates to techniques for supporting organizational, labeling and retrieval tasks on an electronic tabletop, wall or large display. In various embodiments of the invention, a dynamic visualization is used to show a current working set of documents. In an embodiment of the invention, the rest of the collection is represented in the background as small dots. In an embodiment of the invention, when a user moves objects into groups or creates a label, relevant objects in the background are automatically retrieved and moved into the foreground. In an embodiment of the invention, retrieved objects along with relevant objects in the current set are highlighted and decorated with arrows pointing to their relevant groups. In an embodiment of the invention, the movement is animated to provide user feedback when objects must travel long distances on a large display.

20 Claims, 8 Drawing Sheets

OTHER PUBLICATIONS

Moran, et al., "Implicit Structure for Pen-Based Systems within a Freeform Interaction Paradigm," Proc. of CHI '95, pp. 487-494 (1995).

Olsen et al., "Visualization of a Document Collection: The Vibe System", *Information Processing and Management*, vol. 29(1): pp. 69-81 (1993).

Jun Rekimoto, "Pick-and-Drop: A Direct Manipulation Technique for Multiple Computer Environments", *Proc. of UIST '97*, pp. 31-39 (1997).

Shen, et al., "UniTable: Impromptu Face-to-Face Collaboration on Horizontal Interactive Surfaces", *Proc. of UbiComp '03*, pp. 281-288 (2003).

Shipman et al., "Finding and Using Implicit Structure in Human-Organized Spatial information Layouts," Proc. of CHI '95, pp. 346-353 (1995).

Ahlberg, "Visual information seeking: tight coupling of dynamic query filters with starlield displays," Proceedings of CHI '94, pp. (1994), ftp://ftp.cs.umd.edu/pub/hcil/Reports-Abstracts-Bibliography/3131htm1/3131.html.

Beyer, "Contextual Design: Defining Customer-Centered Systems," Morgan Kaufmann Publishers Inc., San Francisco, CA, 1997.

Chiu, P., et al., "mTable: A Table Top Video and Media Browser," ACM Multimedia '08 Conference, Oct. 27-30, 2008, Vancouver, BC, Canada.

Clusty Search Engine. www.clusty.com.

Flickr Photo Sharing Website. www.flickr.com.

Hascoet, M., "Throwing models for large displays," Proceedings of HCI '03, Designeing for Society, vol. 2, pp. 73-77, British HCI Group 2003.

loffe, S. (2003). Red Eye Detection with Machine Learning. IEEE International Conference on Image Processing, vol. 11, pp. 871-874, 2003.

Lucene text search engine software. Apache software Foundation, http://lucene.apache.org.

Matsushita et al., "Lumisight table: a face-to-face collaboration support system that optimizes direction of projected information to each stakeholder," Proceedings of CSCW '04, pp. 274-283 (2004).

Moran et al., "Spatial interpretation of domain objects integrated into a freeform electronic whiteboard," Proceedings of UIST '98, pp. 175-184 (1998).

Patten et al., "Sensetable: A wireless object tracking platform for tangible user interfaces," Proceedings of CHI '01, pp. 253-260 (2001).

Prante et al., "Room ware: Computers Disappear and interaction evolves," IEEE Computer, 37 (12):47-54 (Dec 2004).

Ringel et al., "Release, relocate, reorient, resize: fluid techniques for document sharing on multi-user interactive tables," CHI 2004, Apr. 24-29 2004, Vienna, Austria, pp. 1441-1444 (2004).

Ryall, et al., "Exploring the effects of group size and table size on interactions with tabletop shared-display groupware," Proceedings of CSCW '04., Nov. 6-10, Chicago, Illinois, pp. 284-293 (2004).

Scott et al., "Territoriality in collaborative tabletop workspaces," Proceedings of CSCW '04., Nov. 6-10, Chicago, Illinois, pp. 294-303 (2004).

Scupin, R., "The KJ Method: A Technique for Analyzing Data Derived from Japanese Ethnology," Hunan Organization, 56(2): 233-237 (1997).

Shen et al., "Personal Digital Historian: User interface design," CHI '01, Extended Abstracts, pp. 29-30 (2001).

Shen, et al., DiamondSpin: an extensible toolkit for aroundthe-table interaction-Proceedings of CHI '04, pp. 167-174 (2004).

Spool, J., "The KJ-Technique: A Group Process for Establishing Priorities," http://www.uie.com/articles/kj_technique/ (2004).

Stahl et al., "Information exploration using the Pond," Proceedings of CVE '02, pp. 72-79 (2002).

Streitz et al., "Roomware for cooperative buildings: Integrated design of architectural spaces and information spaces," Proceedings of CoBuild '98, Springer, pp. 4-21 (1998).

Tandler et al., "ConnecTahles: Dynamic coupling of displays for the flexible creation of shared workspaces," Proceedings of UIST '01, pp. 11-20 (2001).

UNCRD, KJ Method, Second Thematic Training Course (Nov. 1-30, 2001), United Nations Centre for Regional Development (UNCRD), Nagoya, Japan, http://www.uncrd.or.jp/hs/O1i_ttc2/doc/Olim5_23noji_ppt.pdf (2001).

* cited by examiner

INTERACTIVE TECHNIQUES FOR ORGANIZING AND RETRIEVING THUMBNAILS AND NOTES ON LARGE DISPLAYS

BACKGROUND OF INVENTION

1. Field of the Invention

The present invention relates to interactive methods to organize, retrieve and make effective use of large displays.

2. Description of the Related Art

Advances in technology for large displays such as Liquid Crystal Displays (LCD), plasma screen, and projectors are making large displays ubiquitous in business, education, and home environments. In the future, computerized tabletop and wall display systems will become more common. Applications will make use of the form factors of these large shared displays. Many of these applications will be different from those designed for a desktop personal computer (PC) and will require new interaction techniques.

The 'Pond' is a tabletop application for retrieving music Compact Disc (CD) thumbnails. Stahl, O., Wallberg, S., Soderberg, J., Humble, J., Fahlén, L., Bullock, A., Lundberg, J. (2002) Information exploration using the Pond. *Proceedings of CVE* '02, pp. 72-79. The metaphor is a pond with shoals of fish. The table has a touch screen display and a Radio Frequency Identification (RFID) reader. RFID tags with pre-defined keywords are placed on the reader to initiate a query. In the Pond, a 'group' (shoal) of objects (fish) is retrieved and displayed in the pond; each query produces a 'group'. There are special creel areas on the pond where the user can select and put interesting objects to make a selection shoal, where the shoal will initiate a query to bring more objects into the environment.

Tabletop applications developed at Mitsubishi Electric Research Laboratories (MERL) support the manipulation of objects and rely on territories to 'group' objects. The 'Personal Digital Historian' supports sharing personal digital data: photos, audio, video. Shen, C., Beardsley, P., Lesh, N., Moghaddam, B. (2001) Personal Digital Historian: User interface design. *CHI] '01 Extended Abstracts* pp. 29-30. The interaction model is a lazy Susan: users can drag their hands along the outer rim of a table to spin the displayed objects. 'UbiTable' and 'DiamondSpin' support partitioning a table into public and personal areas. Shen, C, Everitt, K. M., & Ryall, K. (2003) UbiTable: Impromptu face-to-face collaboration on horizontal interactive surfaces. *Proceedings of UbiComp* '03, pp. 281-288 and Shen, C., Vernier, F., Forlines, C., Ringel, M. (2004) DiamondSpin: an extensible toolkit for around the-table interaction. *Proceedings of CHI* '04, pp. 167-174.

Other tabletop systems with features that are related to this invention include Streitz, N. A., Geiβler, J. & Holmer, T. (1998) Roomware for cooperative buildings: Integrated design of architectural spaces and information spaces, *Proceedings of CoBuild* '98, Springer, pp. 4-21; Tandler, P., Prante, T. Muller-Tomfelde, C., Streitz, Steinmetz, R. (2001) ConnecTables: Dynamic coupling of displays for the flexible creation of shared workspaces. *Proceedings of UIST* '01, pp. I 1-20; Patten, J., Ishii, H., Hines, J., and Pangaro, G. (2001) Sensetable: A wireless object tracking platform for tangible user interfaces. *Proceedings of CHI* '01, pp. 253-260; Matsushita, M., Iida, M., Ohguro, T., Shirai, Y., Kakehi, Y., Naemura, T. (2004) Lumisight table: a face-to-face collaboration support system that optimizes direction of projected information to each stakeholder. *Proceedings of CSCW* '04, pp. 274-283; Ringel, M., Ryall, K., Shen, S., Forlines, C., Vernier, F. (2004) Release, relocate, reorient, resize: fluid techniques for document sharing on multi-user interactive tables. *CHI* '04 *Extended Abstracts*, pp. 1441-1444; Ryall, K., Forlines, C., Shen, C., Morris, M. (2004) Exploring the effects of group size and table size on interactions with tabletop shared-display groupware. *Proceedings of CSCW* '04. pp. 284-293; Scott, S., Sheelagh, M., Carpendale, T., Inkpen, K. (2004) Territoriality in collaborative tabletop workspaces. *Proceedings of CSCW* '04, pp. 294-303.

Electronic Walls and Work Surfaces

Research systems for organizing objects on electronic whiteboards and work surfaces at Palo Alto Research Center (PARC) include 'VIKI' and 'Tivoli'. Shipman, F. M., Marshall, C. C., & Moran, T. P. (1995) Finding and using implicit structure in human-organized spatial information layouts. *Proceedings of CHI* '95, 346-353; Moran, T. P., Chiu, P., van Melle, W., Kurtenbach, G. (1995) Implicit structures for pen-based systems within a freeform interaction paradigm. *Proceedings of CHI* '95, pp. 487-494; Moran, T. P., van Melle, W., and Chiu, P. (1998) Spatial interpretation of domain objects integrated into a freeform electronic whiteboard. *Proceedings of UIST* '98, pp. 175-184. These systems support recognition of the implicit structure of objects on a freeform work surface. In particular, objects that form "blobs" are detected by determining 'groups' of objects that touch or by detecting 'groups' through clustering using spatial density.

The 'DynaWall' system supports grouping of electronic "cards" using a magnet metaphor. Prante, T., Streitz, N., Tandler, P. (2004) Roomware: Computers Disappear and interaction evolves. *IEEE Computer,* 37 (12): 47-54 (December 2004). Element cards repel each other so that when one is dragged on top of another overlap is avoided. Title cards attract other cards so that when an element card is dragged on it, they stick together. Retrieval by grouping is not supported.

Other recent research projects investigating interaction techniques for manipulation on large displays include: 'Pick-and-Drop'; 'Drag-and-Throw', 'Push-and-Throw'; 'Drag-and-Pop', 'Drag-and-Pick'; 'Push-and-Pop'. Rekimoto, J. (1997) Pick-and-Drop: A direct manipulation technique for multiple computer environments. *Proceedings of UIST* '97. ACM Press, pp. 31-39; Hascoet, M. (2003) Throwing models for large displays. *Proceedings of HCI* '03, pp. 73-77; Baudisch, P., Cutrell, E., Robbins, D., Czerwinski, M., Tandler, P. Bederson, B., and Zierlinger, A. (2003) Drag-and-Pop and Drag-and-Pick: Techniques for Accessing Remote Screen Content on Touch- and Pen-operated Systems. *Proceedings of Interact* '03, pp. 57-6; Collomb, M., Hascoet, M., Baudisch, P., and Lee, B. (2005) Improving drag-and-drop on wall-size displays. *Proceedings of GI* '05, Victoria, BC, May 2005, pp 25-32. The 'Drag-and-Pop' and 'Push-and-Pop' techniques identify potential targets by compatibility with the type of icon or document being moved. With the 'Drag-and-Pop' technique, as the user drags an object toward the direction of a target, copies of potential targets pop up along the direction of the drag and are brought closer to the source object. These copies are graphically connected to their originals by rubber bands. 'Push-and-Pop' is a similar technique, except that it surrounds the dragged object with potential targets in an overlaid "take-off area".

Interaction and Visualization for Grouping and Retrieval

The 'Scatter/Gather' system supports narrowing a search by iteratively clustering the results and allowing the user to select relevant clusters; the reduced corpus based on the gathered selected clusters is re-clustered and the process repeats. Cutting, D., Karger, D., Pedersen, J., Tukey, J. (1992) Scatter/

Gather: a cluster-based approach to browsing large document collections. *Proc. ACM SIGIR '92*, pp. 318-329.

The 'VIBE' system uses visualization for document retrieval with points of interest defined by key terms and a location on the display. Olsen, K. A., Korfhage, R. R., Sochats, K. M., Spring, M. B. and Williams, J. G. (1993) Visualization of a Document Collection: the VIBE System, *Information Processing & Management*, 29(1): 69-82. The retrieved documents are positioned based on their relevance to the points of interest using a force model. A weakness of the 'VIBE' type of system is that when an object is under the influence of multiple forces, it can be difficult to interpret the relevant clusters.

SUMMARY OF THE INVENTION

The present invention relates to techniques for supporting organizational, grouping, labeling and retrieval tasks on an electronic tabletop or large wall display. In embodiments of the invention, a dynamic visualization is used to show a current working set of documents. In an embodiment of the invention, the rest of the collection is represented in the background as small dots. In various embodiments of the invention, when a user moves objects into 'groups' or creates a label, relevant objects in the background are automatically retrieved and moved into the foreground. In various embodiments of the invention, retrieved objects along with relevant objects in the current set are highlighted with codes, color, decorations or with arrows pointing to their relevant groups. In an embodiment of the invention, when there is uncertainty or ambiguity, the relevant objects are not automatically moved into their 'groups' and a user is given an opportunity to interpret the relations and click on an arrow to send an object into a 'group'. In an embodiment of the invention, the movement is animated to provide user feedback when objects are separated by long distances on a large display.

BRIEF DESCRIPTION OF THE DRAWINGS

Preferred embodiments of the present invention will be described in detail based on the following figures, wherein.

DETAILED DESCRIPTION

Figure 1A:
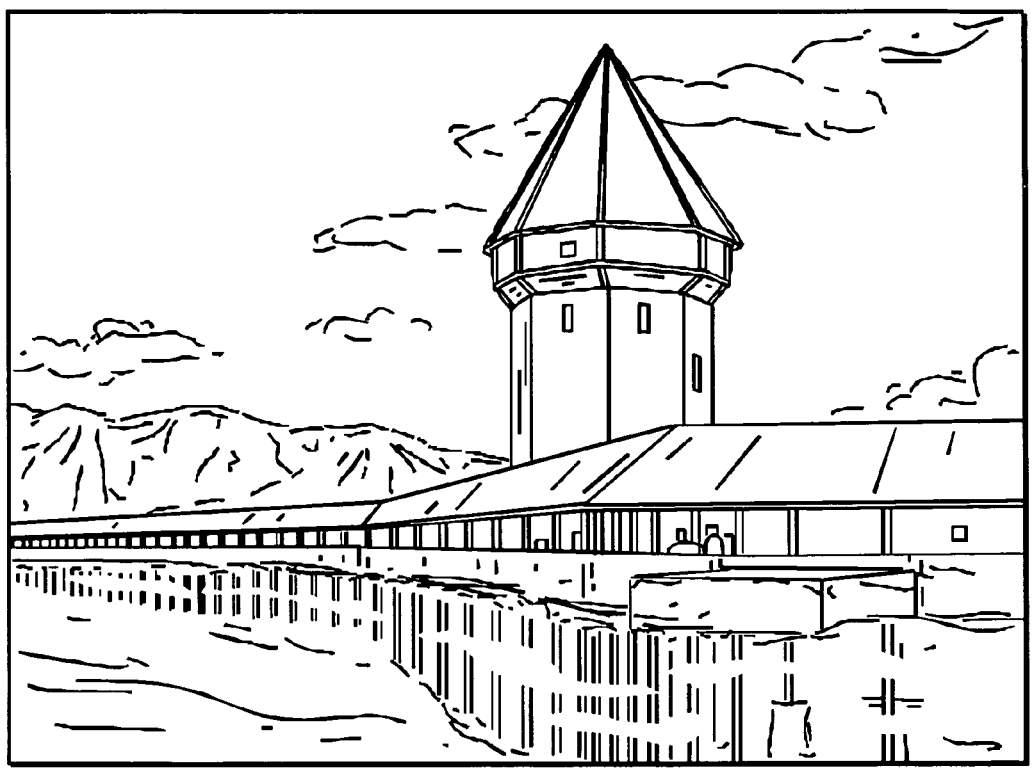
FIG. 1 Examples of data objects: photo thumbnail, video thumbnail and notes.
Figure 1B:
Figure 1C:
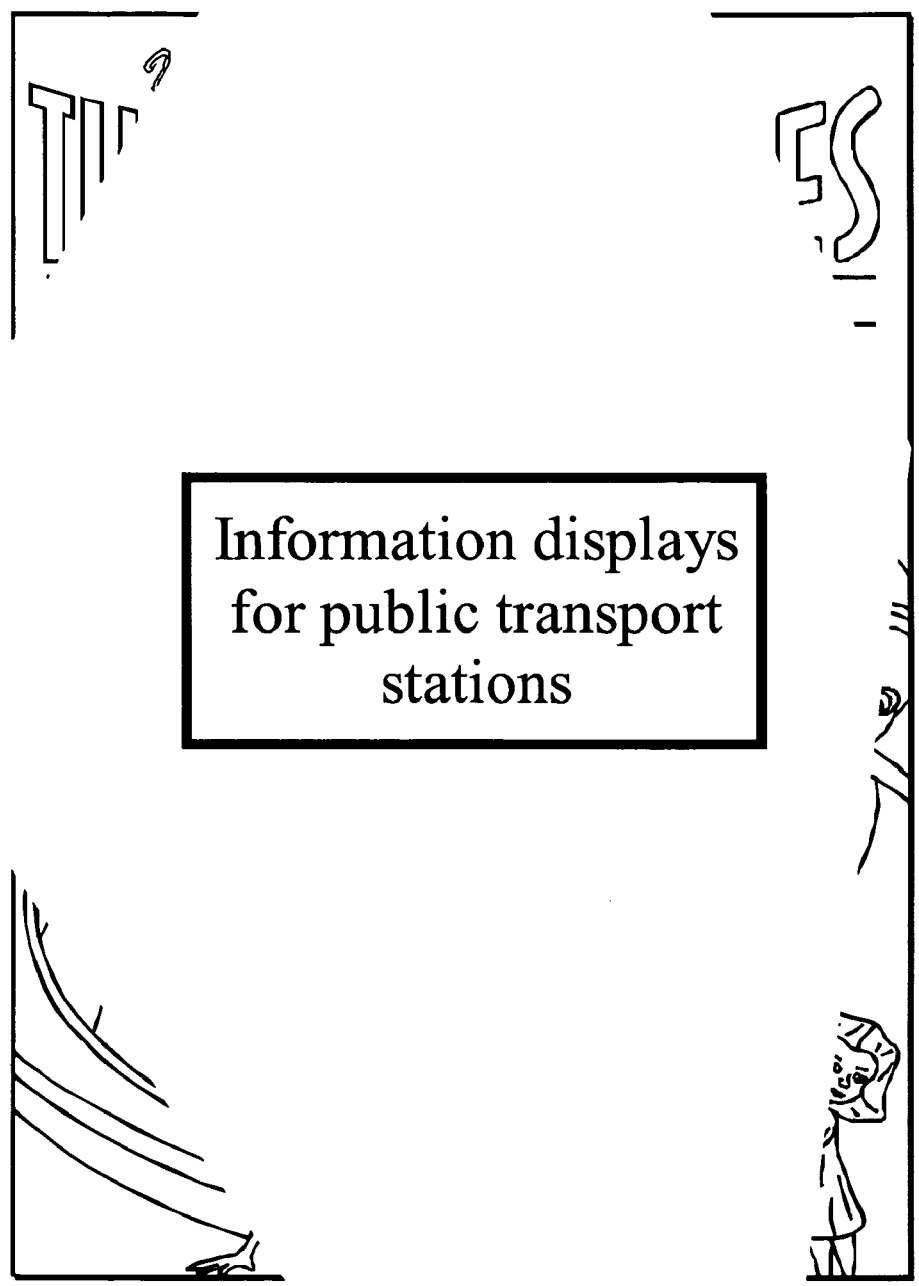

When electronic surfaces such as tabletop and wall displays are used as the workspace for grouping or labeling, data exploration and sense making can be facilitated by the data analysis and retrieval capability of computers. We describe a system of integrated interaction techniques for supporting a class of computer applications for large displays that handle organizing and retrieving graphical objects, which have associated text metadata. Examples of graphical objects are thumbnails and notes (see FIG. 1). More generally, icons representing any type of documents or data can also be used. The text metadata consist of keywords or descriptions of the data and can be machine generated (e.g., timestamps, GPS coordinates, face, event or location similarities), or human created (e.g., annotations or comments). The display is a freeform work surface that is unstructured; the graphical objects can be placed anywhere on the screen without constraints. When the data has ambiguities and uncertainties, as real data tend to have, the computerized display does not go too far in automatically clustering the data. Thus, the user has the opportunity to interpret and direct the data around the display.

In various embodiments of the present invention, the surface is not specially designated into specific areas. As a result, the invention's uniform surface is more versatile in how the screen real estate can be used. This is in contrast with the 'Pond', 'UbiTable' and 'DiamondSpin'. This difference can be important for large tables and wall displays where special areas may be visually unobscured but physically difficult to reach. In various embodiments of the present invention, more flexible grouping is possible where the user can rearrange the 'groups' in any fashion.

In various embodiments of the present invention, retrieval by grouping and the interaction technique for target snapping are supported. In contrast, these capabilities are not supported by 'VIKI', 'Tivoli', 'DynaWall' and 'Scatter/Gather'. In various embodiments of the present invention each 'group' is not automatically formed from a query, rather the retrieved objects are dispersed on the display and arrows are used to indicate possible 'group' membership. This solves the problem that an object can potentially belong to multiple groups. In addition, in various embodiments of the invention the user is given an opportunity to make an interpretation of the data clustering before moving the objects. Furthermore, this multi-layered spatial model provides structure along the depth of the display to visualize the working set, the collection, the retrieved objects, and the previously retrieved objects. In an embodiment of the present invention, the set of documents does not successively narrow rather it gives new views of relevant documents based on how the user forms the groups. This emphasizes the common terms in those groups.

In various embodiments of the present invention, the interaction techniques are motivated by how people organize physical objects and are grounded on well-established methods for sense-making or analyzing data written on Post-it notes such as affinity diagrams and the KJ Method. Beyer, B., Holtzblatt, K. (1998) *Contextual Design: Defining Customer-Centered Systems*, Morgan Kaufmann Publishers Inc., San Francisco, Calif., 1997; Scupin, R. (1997) The KJ Method: A Technique for Analyzing Data Derived from Japanese Ethnology. *Hunan Organization*, 56(2): 233-237 (1997); UNCRD. (2001) KJ Method, Second Thematic Training Course (1-30 Nov. 2001), United Nations Centre for Regional Development (UNCRD), Nagoya, Japan (http://www.uncrd.orjp/hs/01i_ttc2/doc/01i_m5_23noji_pt.pdf; last visited Mar. 13, 2006); Spool, J. (2004) The KJ-Technique: A Group Process for Establishing Priorities (http://www.uie.com/articles/kj_technique/; last visited Mar. 14, 2006). The basic tasks involve putting objects into 'groups' and often include putting labels on 'groups' of objects.

In various embodiments of the present invention, the application domain can have purely informational objects without application icons, and thus the user cannot easily tell if there exists potential targets before initiating an action. In an embodiment of the present invention, this problem is resolved by providing visual hints with the arrows and 'group' object borders. This resolution distinguishes this embodiment from the 'Drag-and-Pop' and 'Push-and-Pop' techniques.

In various embodiments of the present invention, the model's retrieval forces act on the objects along the depth of the display but not parallel to the display. This allows tight clusters to be formed as the user decides where to move the objects, in contrast to the 'VIBE' system.

In various embodiments of the present invention, the retrieval function is integrated with both the 'grouping' and labeling functions. In an embodiment of the present invention, the current working set of documents can be shown as full-sized objects in the foreground, and the rest of the collection can be visualized by dots in the background (see FIG. 2). In an embodiment of the present invention, a 'group' can be formed when the user moves objects together and the system detects sets of overlapping objects and declares them to be 'groups' (see FIG. 3). In various embodiments of the present invention, labels are created when the user makes a new label object on the display and enters text on the label. In an embodiment of the present invention, for grouping, retrieval can be implicit in the sense that the system infers a query string by using the metadata from the objects in the 'group' (see below). On the other hand, for labeling; retrieval can be explicit where the query string directly takes the text on the label.

In various embodiments of the present invention, to highlight relevant objects with respect to their 'groups', the system can show visual hints by implicit and explicit brushing. Brushing is visualization terminology for highlighting objects that have a certain set of attributes. In various embodiments of the invention, brushing is a technique for coloring or decorating objects that share some set of attributes. In visualization software, a common way to perform brushing is for the user to enter attribute values on a control panel on the application window; e.g. with dynamic queries and starfield displays. Ahlberg, C., Shneiderman, B. (1994) Visual information seeking: tight coupling of dynamic query filters with starfield displays. *Proceedings of CHI '94*, pp. 313-317. In an embodiment of the present invention, the interactive brushing technique is used. This technique is performed indirectly through labeling and grouping. As with retrieval, the brushing can be explicit (initiated by labeling) or implicit (as a consequence of grouping). Objects in 'groups' or labels are decorated with a code, for example, a color border and relevant objects are decorated with the same code for example the same color border.

Figure 6:
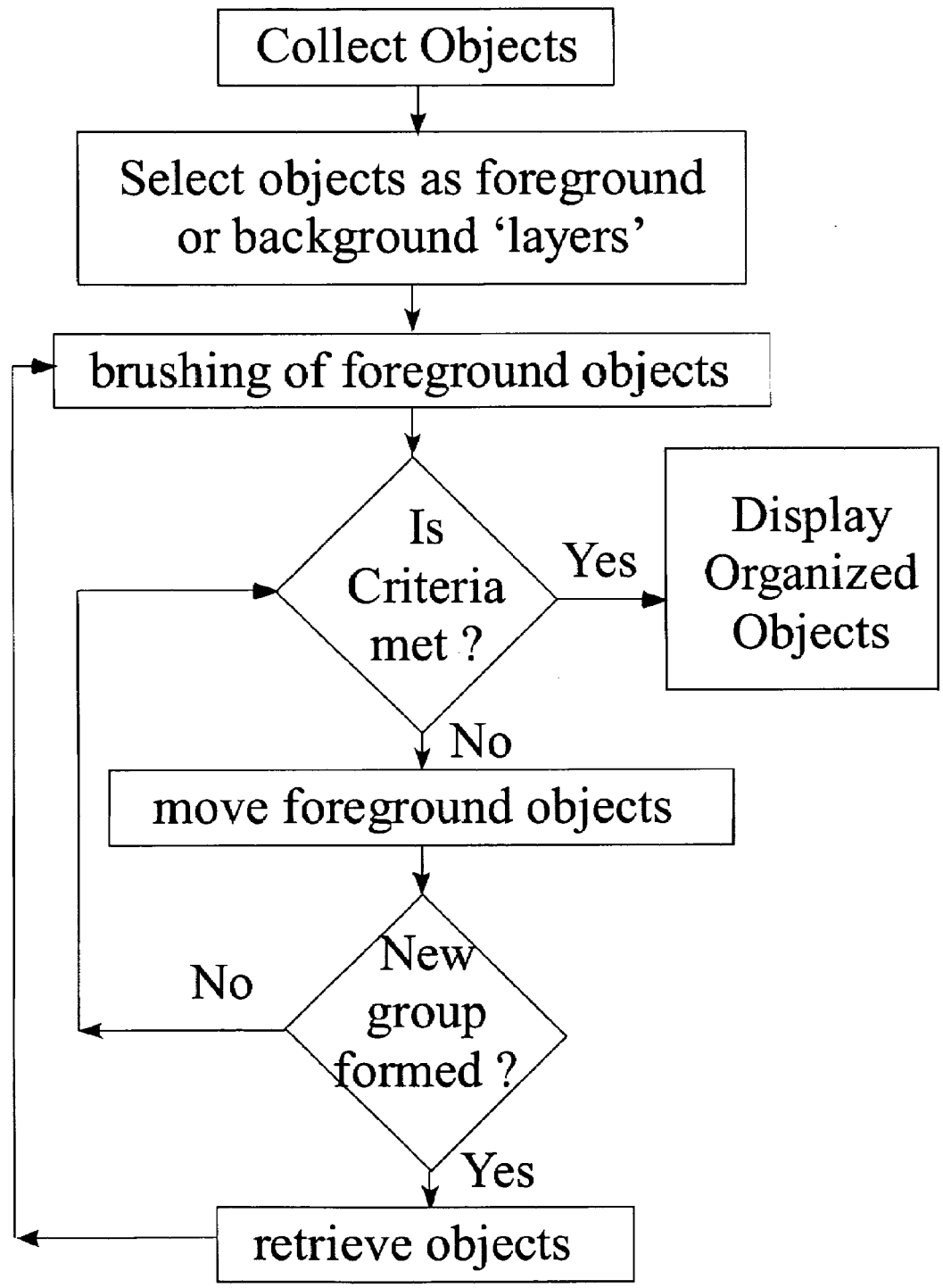
FIG. 6 shows a block diagram of the steps involved in organizing objects to be displayed.

In various embodiments of the invention, the implicit brushing technique continually does 'group' detection and analyzes 'group' member text and metadata to initiate the coding, coloring or decorating of objects that share some set of attributes based on this dynamic 'group' information without requiring the user to formally label the groups (see the flow diagram in FIG. 6). The system detects groups based on aggregate information. When a 'group' is detected, their borders are painted with the group's code, for example a color, which is assigned by the system at the time of 'group' formation. In an embodiment of the invention, the objects can be depicted on the large screen as overlapping, i.e., the perimeter of the objects in the 'group' touch. Transparency is used to show how relevant an object is to the group. For each 'group' the aggregate information is considered and scores for each term are weighted by relevance and number of occurrences. The aggregate information provides an objective description of the groups that cover all related attributes.

When doing brushing, visual hints are generated for related data. Some of this data is already on the workspace while other data is retrieved as a result of the brushing. Hence, the brushing process not only draws attention to data objects on the workspace, but also brings into the workspace related data from a database or network. This feature employs relevance feedback by generating a query for each 'group' thereby boosting the common terms that occur in a group. While the retrieval mechanism is similar to existing systems (see e.g., Cutting, D., Karger, D., Pedersen, J., Tukey, J. (1992) Scatter/Gather: a cluster-based approach to browsing large document collections. *Proc. ACM SIGIR '92*, pp. 318-329), the interface is designed to support this in a visual manner as the graphical objects on the workspace are manipulated during exploration and sense making.

In one embodiment of the invention, the Z dimension (or scale change) is used to represent this process of information retrieval triggered by the grouping manipulations. Depending on an object's relevance status, it is positioned at different depths and appears in different sizes. See FIGS. 2-4. In one embodiment of the invention, the data are divided into four layers: (1) working set, (2) relevant peripheral data, (3) previously retrieved peripheral data and (4) peripheral dataset. The peripheral dataset is represented by dots in the background using a different transparency to show their prior layer representation. Displaying the dots in Layer 4 is optional; e.g., it is feasible to do this for peripheral data coming from a relatively small well-defined collection in a database but not for data coming from the entire Web. The retrieved peripheral objects move in and out along the layer depth as their relevance status is changed during the grouping and labeling performed by the users. At the same time as retrieving relevant data, the relevance status of previously brushed data is checked. The visual hints on data objects no longer relevant will be removed. For example, those that were retrieved from the peripheral database initially but which are not relevant when the status is checked will be sent to the "previously retrieved peripheral data" layer.

Standard drag-and-drop operations from desktop PCs do not work well on a large display. The target snapping technique is developed to provide convenience in moving data objects to their potential groups, especially considering the size of the typical displays for which the interface is intended. In an embodiment of the invention, target snapping is utilized to make the arrow visual hints from brushing interactive. In an embodiment of the present invention, target snapping involves the user tapping on an object arrowhead, whereupon the computer assisted transfer of the object across the display to the relevant group is initiated. In an embodiment of the invention, the transfer is shown with animation. In an embodiment of the invention, a rapid and fluid manipulation of objects is supported through target snapping. Colored arrows are decorated on objects that are relevant to groups on the display; each arrow is colored the same color as a relevant group's color and points to that group. An object can have more than one arrow since it may be relevant to multiple groups. The user can click on an arrow to send the object to the group: the movement is animated and the object snaps to the target group. See FIGS. 3 and 4.

Supporting orientation is important for table displays. In an embodiment of the invention, users can tap or click on an object and drag it around. In various embodiments of the invention, an object can also be rotated. Rotating an object can make that object stand out and therefore provides a clear way of distinguishing it from other non-rotated objects and which can be an effective way to bookmark the object. In an embodiment of the invention, pressing down on an object magnifies it for better viewing.

Figure 4:
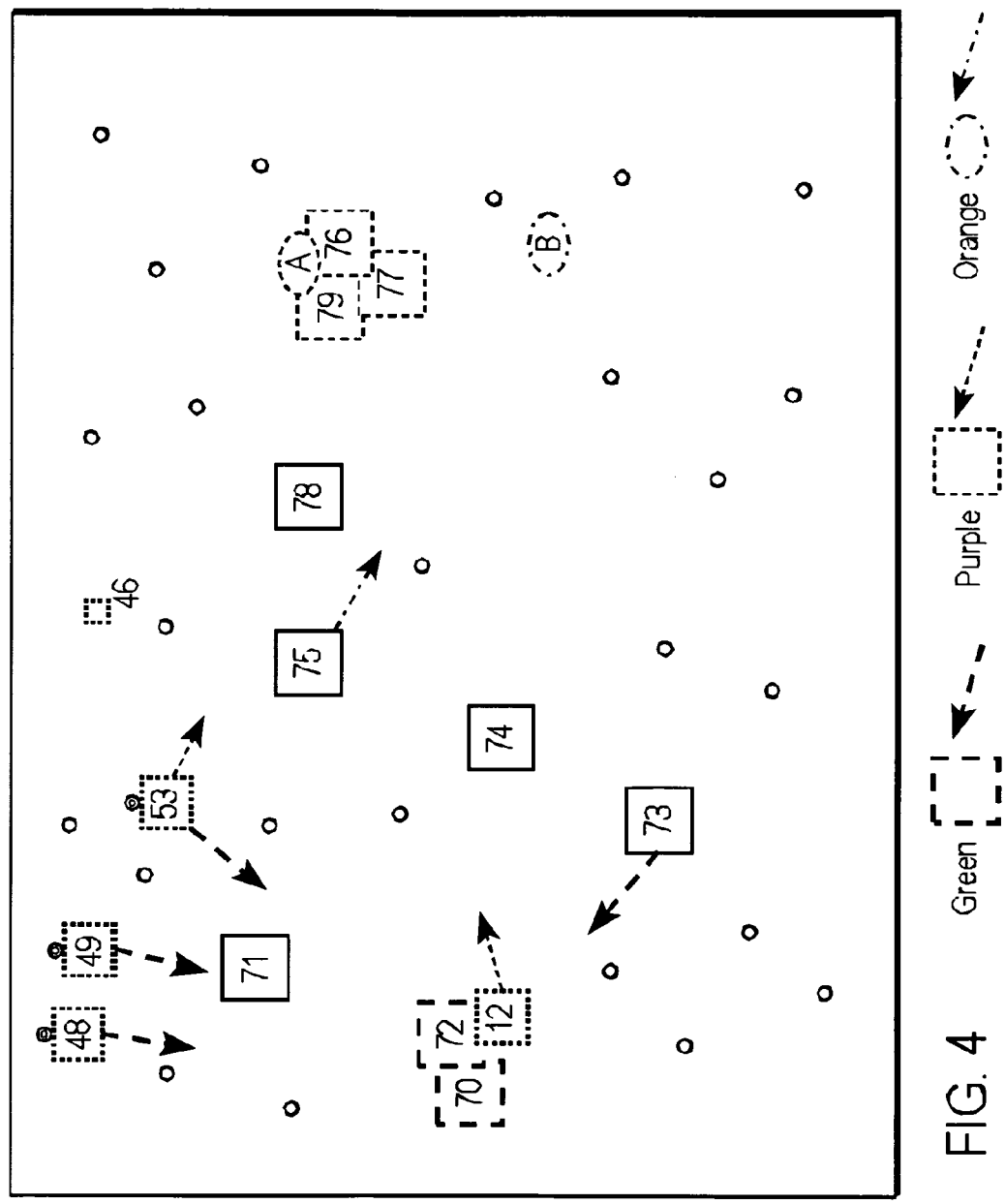
FIG. 4 shows the objects displayed in FIG. 3, where object 12 was moved by clicking on its green arrow pointing North-West in FIG. 3.
Figure 5:
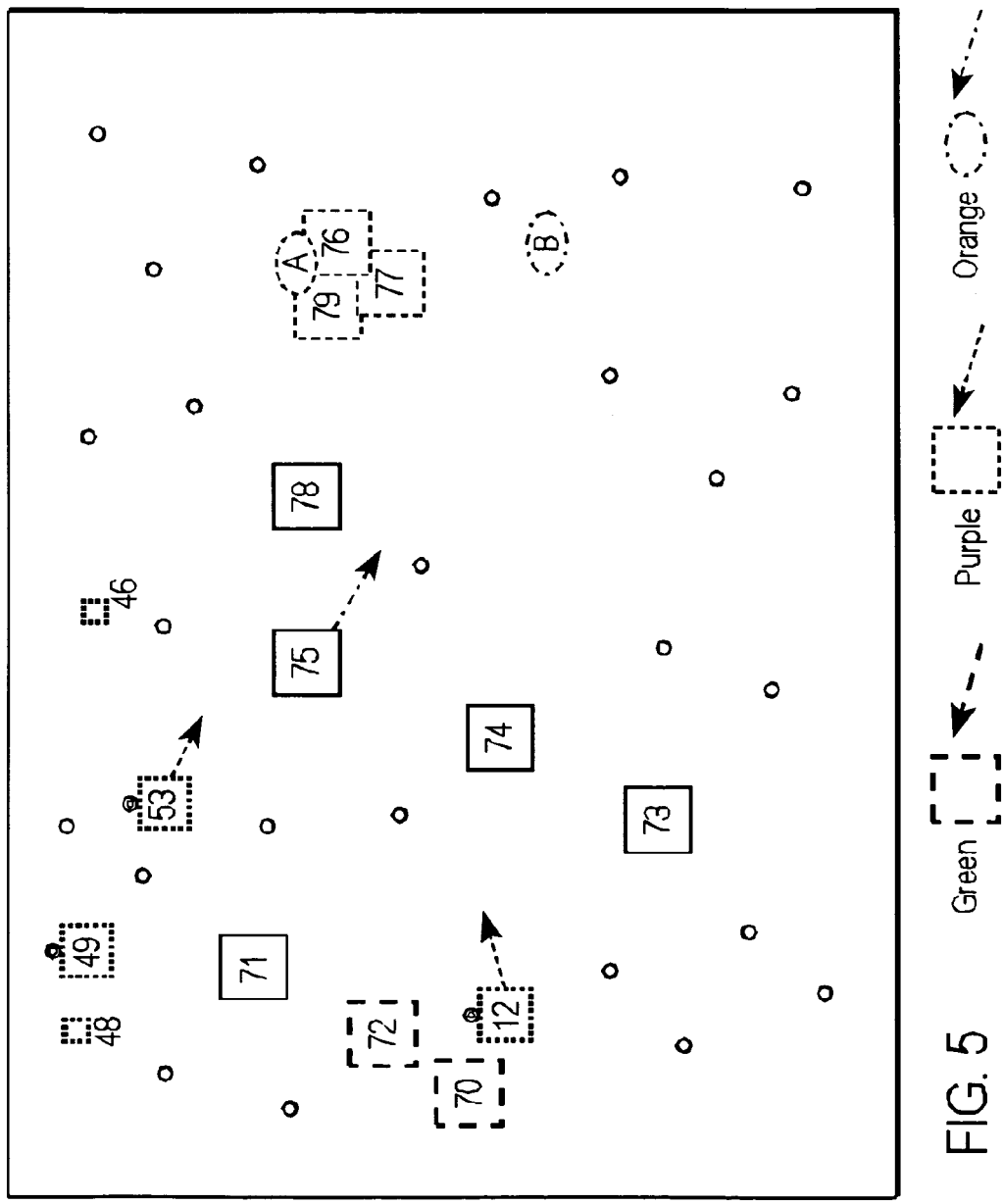
FIG. 5 shows the objects displayed in FIG. 4, where pinning of the retrieved object 49 keeps it in the retrieved layer when the 'group' is broken up.

In various embodiments of the present invention, a retrieved object can also be pinned to the foreground (see FIGS. 4 and 5). By clicking on the pin widget on the top edge of the object, the object will not recede into the background once that object is no longer relevant to the current query. Unpinned objects that have been previously retrieved recede only partially into the background and remain accessible during a session (see FIGS. 4 and 5).

In various embodiments of the present invention, a label object can be used. Firstly, when the meaning of a 'group' is getting clearer, the user can label it with a certain phrase. Secondly, when the user wants to form a 'group' with predetermined keywords, she can initialize an explicit brushing by placing a label on an empty area in the working space. In both cases, right clicking on the label would bring up a list of phrases suggested by the system based on the text analysis of the 'group' or the working set. When the application exits, phrases on the labels can be saved out and added to the metadata of the 'group' members.

Figure 2:
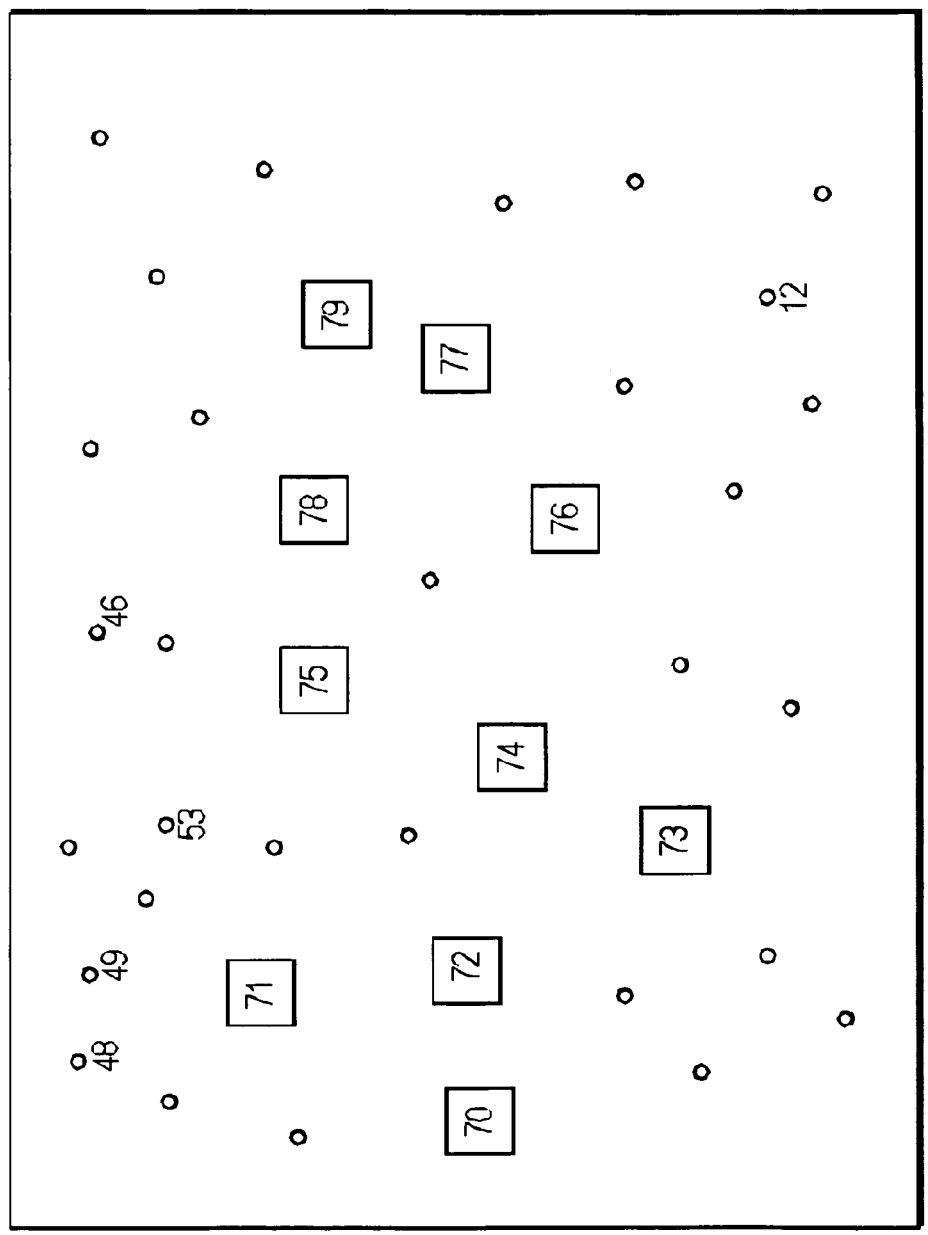
FIG. 2 shows a current working set in foreground (represented by squares) and collection in background (represented by small dots)

During a session, the working set is shown in the foreground layer and the peripheral data from a database shown in the background. Initially, the objects are randomly scattered on the display. Schematically, this is illustrated in FIG. 2.

Figure 3:
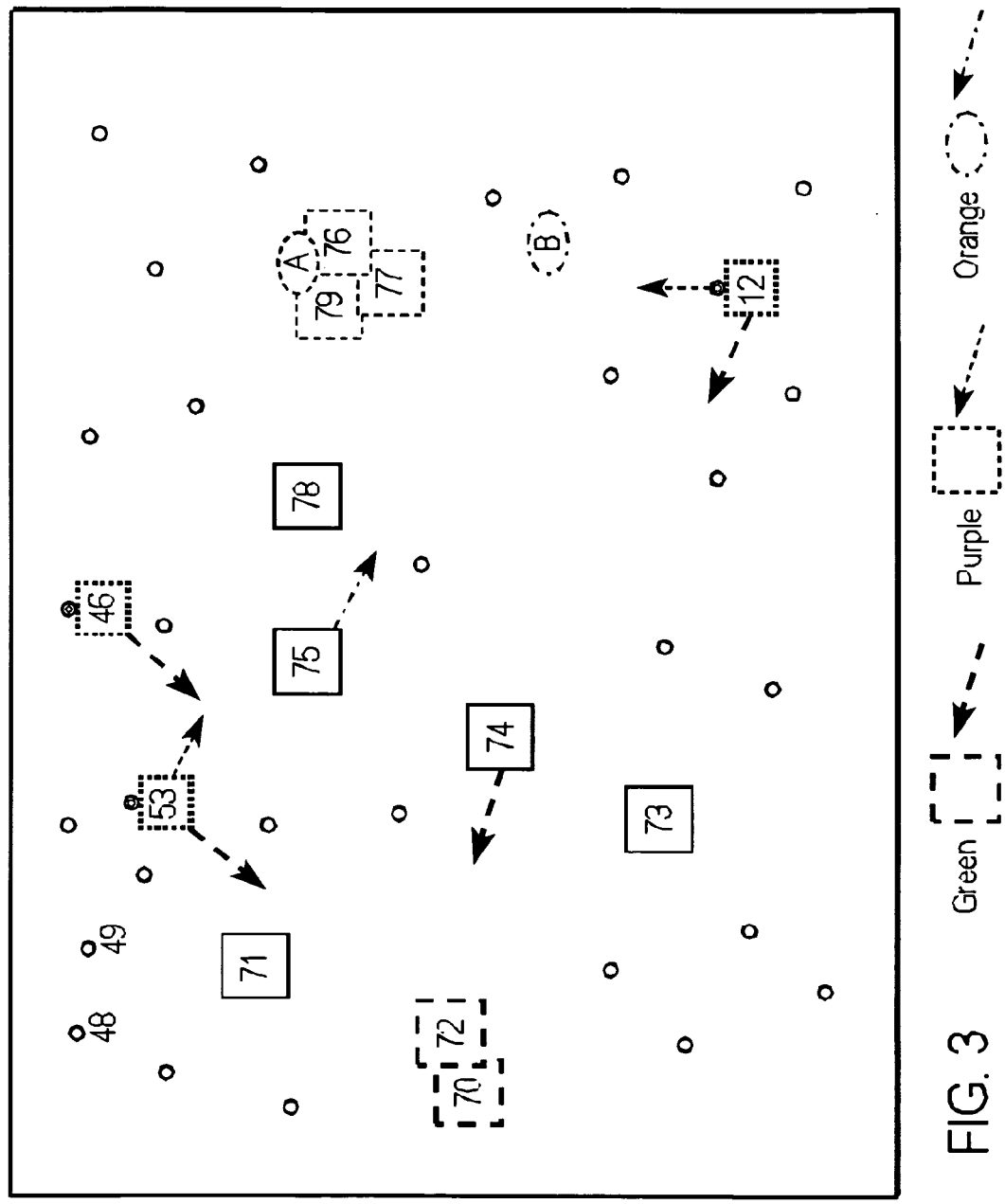
FIG. 3 shows the objects displayed in FIG. 2, after explicit retrieval through labeling and implicit retrieval through grouping; where the oval objects represent labels.

A grouping and brushing example will be explained in detail aided by illustrations in FIGS. 2-4. When the user moves object 72 together with 70 with overlap, a 'group' is formed, the 'group' is detected and implicit brushing is triggered. As a result, an arrow pointing to the 'group' with the group's color (green) is added to object 74 in the working set. Objects 12, 46 and 53 from the database are retrieved to the "relevant peripheral data" layer and added arrows pointing to the group. Target snapping (clicking on the green arrow) on object 12 moves it to 'group' {70, 72}. This changes the target 'group' to {12, 70, and 72}, which triggers another round of implicit brushing. As shown in FIG. 4, objects 48 and 49 are retrieved from the database plus object 73 from the working set are now brushed as relevant. At the same time, the relevance status of the previously related data is checked. Visual hints are removed from objects 46 and 74 as no longer being relevant, and object 46 from the database is sent backward to the "previously retrieved peripheral data" layer.

In various embodiments of the present invention, dragging a label can move the whole 'group' of overlapping member objects. In an embodiment of the present invention, dragging a data object moves only that object regardless of whether it is part of a 'group' or not since a 'group' formalized with a label should be manipulatable as a whole unit as a user has intended it to be a unit. Whereas a 'group' that is not labeled should be more amenable to membership changes. In FIGS. 3 and 4, the label objects are represented by ovals. The label object A has been added to the 'group' {76, 77, and 79} to formalize it. Label object B on the workspace shows an example of explicitly initializing a brushing by placing a label in an empty area; its related object 75 is brushed.

In various embodiments of the invention, animation is used to assist visualization and interaction and to provide natural and vivid visual effects. In an embodiment of the invention, when a 'group' is moving around, all the arrows pointing to this 'group' are continuously re-oriented to keep pointing to the group. In an embodiment of the invention, arrows on 'group' members pointing to their potential groups can also be re-oriented accordingly. In an embodiment of the invention, when arrows are added to relevant objects or removed from no longer relevant objects, blinking fade-in and blinking fade-out animations can be employed to attract the attention of users. In an embodiment of the invention, target snapping motion is animated to make it easier for users to follow the action. In an embodiment of the invention, animations along the Z dimension are also employed when retrieving objects from the "peripheral data" layer to the "relevant peripheral data" layer and when sending them back to the "previously retrieved peripheral data" layer.

EXAMPLE 1

Photo Browsing Scenario

The first scenario is browsing photos on an electronic table. The premise is that in the near future, computers will not be confined to a desktop with a mouse-keyboard & windows graphical interface. This scenario is motivated by the fact that people browse photos in the big photo albums often found on coffee tables in living rooms.

Alice is sitting in the living room at her friend's house browsing a photo collection on an electronic coffee table. She begins by creating a query object (which looks like a label) and enters the word "TRAVEL". The system performs the query on the photos metadata, and the most relevant photos are retrieved and displayed as thumbnails dispersed on the screen. Depending on the resolution of the screen, there is a limit on the number of thumbnails shown (say the top 100) She sees her friends grandson Bill in several pictures and moves them to a 'group' in an area of the table in front of her for better viewing.

This grouping action is interpreted by the system as the user indicating that a 'group' of photos is interesting. In response, the system generates a new query based on this group's photos in which Bill becomes emphasized. A new set of photo thumbnails relevant to "Bill" or "TRAVEL" is retrieved and the display shows the most relevant (top 100). Some of these will already be on the screen from the previous query on "TRAVEL"; others relevant to "Bill" will be brought to the foreground and the less relevant "TRAVEL" thumbnails will fade into the background. By either creating query objects or moving the thumbnails around into groups, Alice can interactively explore the photo collection. In some ways it's as if Alice is having an informal conversation with the table: the topic shifts fluidly and effortlessly from one subject to the next as she learns more about those parts of her friend's life through the photos that she finds interesting.

The system can also be used to label photos when they are uploaded. When Alice's friend uploads a batch of photos from her camera, e.g. 200 photos taken during several recent events, she can sort the photos into groups and place a label object on each group. (Label objects are like virtual Post-it notes and are identical to query objects). The label text can be saved as part of the photos' metadata for future use when browsing.

Because adding metadata requires work, individuals may not always label all their photos. For photos that are shared, people will do some labeling by adding comments, notes and tags (see for example http://Flickr.com; last visited Mar. 10, 2006) In any case, there is always some metadata that can be automatically extracted, such as the time the photo was taken. Location metadata can be obtained with GPS equipped cameras or cell phone cameras. Other research algorithms can detect the presence of faces or people. Ioffe, S. (2003) Red Eye Detection with Machine Learning. *IEEE International Conference on Image Processing, vol.* II, pp. 871-874, 2003.

During browsing, the system facilitates rapid grouping of the photos with the implicit and explicit brushing and the target snapping features described above. Alice can click on the arrows to move photos around on the large coffee table display; the movements are an animated experience, which can be like playing a video game. In addition to improved efficiency, this can be a fun way to browse photos.

Other media can be browsed in a way similar to photos:
Video (thumbnails of DVD covers)
Music (thumbnails of CD covers)

The user can "play" a thumbnail by double-clicking on it (or by some other action depending on the type of input device), and the system activates a player that may be a separate component in the room such as a video monitor or stereo system.

EXAMPLE 2

Sense-Making with Post-It Notes Scenario

There are many variations of using Post-it notes or note cards to collect data, and then manipulating the notes to make sense out of the data. The data is usually qualitative (e.g. ideas from a brainstorming meeting, observations from the field, etc.) Unlike quantitative data for which spreadsheet software with structured cells is suitable, qualitative data requires a freeform work surface supporting different kinds of manipulations. Two well-established methods are Affinity Diagrams and the KJ-Method (discussed above). The following scenario is based on the KJ-Method.

Akira, George, Sophia, and Steven are designing products and applications for a new gadget for showing video. They gather in a meeting room that has a very large display covering almost an entire wall. In the first part of the meeting, they brainstorm by creating virtual Post-it notes on the display, entering ideas about applications for the new video gadget, e.g.—"Use in waiting room to kill time". Together they fill up the wall with 50 to 100 notes.

In the next step, they move the related notes into groups. The system facilitates this by providing the visual hints, arrows, and target snapping. The feature for moving objects is especially useful here because of the long distances that notes must be moved on the wall display.

After grouping, labeled objects are placed in the groups. The labels serve as a higher level description for the notes in a 'group' (e.g. "Security applications" for the gadget) Referring to the labeled groups, Akira, George, Sophia, and Steven can prioritize or vote on which applications to pursue for product development.

The retrieval function described in the photo-browsing scenario is not used in this scenario. However, it can be useful when a large volume of notes has been collected from the field or customer sites, and the notes can be brought into and out of the work surface by either creating query objects (same as labeling objects) or implicitly by grouping during the sense-making process.

Dynamic Visualization Model

In various embodiments of the present invention, the visualization model has four layers: (1) foreground, (2) retrieved layer, (3) previously-retrieved layer, (4) background. In an embodiment of the present invention, from the user's point of view, the first three layers can be thought of as being in the foreground where the user can interact with the objects. In an embodiment of the invention, the user cannot interact with objects in the fourth layer.

In an embodiment of the present invention, the foreground shows the current set of thumbnails or notes in full size. The user can "open" a directory to add objects to the current set in the foreground. The objects are placed on the screen so that they are spread out in a random way.

In an embodiment of the present invention, the retrieved layer shows the retrieved objects in a slightly smaller size than full size (e.g. 75%). The objects on this layer are those retrieved by the current query or retrieved objects that have been "pinned".

In an embodiment of the present invention, the previously retrieved layer shows objects in a reduced size (e.g. 25%). An object can be brought back to the retrieved layer by clicking on it; clicking it again will move it back to the previously retrieved layer.

In an embodiment of the present invention, the background visualizes the entire collection of objects as dots of varying transparency levels based on some attribute such as the age of the object. In the schematic illustrations of FIGS. 2-5, the background objects are represented by small circles without transparency effects; in practice, they are much smaller. As an option, the background can be blanked. In an embodiment of the present invention, users cannot interact with the background objects.

In various embodiments of the present invention, other interactions include enlarging an object, dragging it, and rotating it. Rotating is useful for tabletop displays where the users sit around the table with different orientations. On any type of display setup, rotating an object can make it visually stand out, which can be an effective way to bookmark the object.

Retrieval by Grouping or Labeling

In an embodiment of the present invention, retrieval is accomplished by indexing the keywords and text from the metadata and then computing relevance scores based on a query string.

In an embodiment of the present invention, metadata can be stored with each data directory. A metadata file contains the keywords for the objects in that directory. For the note containing objects, the text of the note can be used as the metadata for retrieval. For photos, metadata from the EXIF image format used by most digital cameras may be extracted when the photos are uploaded to the system; minimally this provides the time and there is a field for the location data. A common feature of popular photo management applications (e.g., Apple iPhoto, Adobe Photoshop Album) allows the user to add keywords and text to their photos, and this method can be used to acquire more metadata. When the photos are shared on the Internet (e.g., Flickr) or belong to an institution's data repository, it is reasonable to allow users to add comments and notes about the photos.

In various embodiments of the present invention, the query string can be obtained explicitly or implicitly. In an embodiment of the present invention, for an explicit query using a label object, the label text is used as the query string. In an embodiment of the present invention, for an implicit query induced by a 'group' of objects, the query string is the union of the metadata text of the objects in the group, with the multiplicity taken into account to provide added weight to boost the relevance score.

The relevance score can be computed using different information retrieval methods; e.g., the standard vector space model and the cosine retrieval function. It is also possible to use a commercial or open source text search engine to compute the relevance score (e.g. Lucene text search engine software. Apache software Foundation, http://lucene.apache.org; last visited Mar. 13, 2006).

Decorations and Sending Objects Across the Screen

An object that is relevant to a 'group' or a label may be in the 'foreground' or 'retrieved layer'. In an embodiment of the present invention, for each of its relevant targets, an arrow decoration pointing to that 'group' or label can be shown (see FIG. 3). An arrow is set to the same color as the target 'group' or labels border color. In embodiments of the present invention, the user can click on an arrow to send the object across the screen to a target group. In an embodiment of the present invention, the motion is animated for user feedback.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

Various embodiments of the invention may be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which can be a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include multiple separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; retrieving one or more objects in the 'foreground' into the 'background' and one or more objects in the 'background' into the 'foreground' based on a common property of the objects; and repeating these steps until one or more criteria is met.

In an embodiment of the invention, a criteria is that the user is satisfied with the group membership of each object on the display.

In an embodiment of the present invention, a computer aided interactive method for organizing plurality objects including files, notes, photographs, music files, and other media collections displayed on a large screen, wherein the plural objects are displayed in a group of foreground objects and a group of background objects comprising the steps of: computer assisted visualizing one or more foreground objects through brushing; moving one or more foreground objects; retrieving one or more objects in the 'foreground' into the 'background' and one or more objects in the 'background' into the 'foreground' based on a common property of the objects; and repeating these steps until one or more criteria is met.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: implicit visualizing of one or more foreground objects through placing at least one decoration on at least one object based on a common property of two or more foreground objects; moving one or more foreground objects; retrieving one or more objects in the 'foreground' into the 'background' and one or more objects in the 'background' into the 'foreground' based on a common property of the objects; and repeating these steps until one or more criteria is met. The method of Claim 1, wherein step (a) involves an implicit act of placing at least one decoration on at least one object based on a common property of two or more foreground objects.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing, wherein brushing involves placing at least one decoration on at least one object based on a common property of two or more foreground objects, wherein the decoration is one or both of an arrow and a colored border; moving one or more foreground objects; retrieving one or more objects in the 'foreground' into the 'background' and one or more objects in the 'background' into the 'foreground' based on a common property of the objects; and repeating these steps until one or more criteria is met. The method of Claim 1, wherein step (a) involves an implicit act of placing at least one decoration on at least one object based on a common property of two or more foreground objects.

In an embodiment of the present invention, a computer aided interactive method for organizing plural of objects including files, notes, photographs, music files, and other media collections displayed on a large screen, wherein the plural objects are displayed in a group of foreground objects and a group of background objects comprising the steps of: visualizing one or more foreground objects through brushing, wherein brushing involves placing at least one decoration on at least one object based on a common property of two or more foreground objects, wherein the decoration is one or both of an arrow and a colored border; user interaction with at least one decoration of at least one object resulting in moving of one or more foreground objects; retrieving one or more objects in the 'foreground' into the 'background' and one or more objects in the 'background' into the 'foreground' based on a common property of the objects; and repeating these steps until one or more criteria is met. The method of Claim 1, wherein step (a) involves an implicit act of placing at least one decoration on at least one object based on a common property of two or more foreground objects.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; user interactive moving of one or more foreground objects; retrieving one or more objects in the 'foreground' into the 'background' and one or more objects in the 'background' into the 'foreground' based on a common property of the objects; and repeating these steps until one or more criteria is met.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; computer assisted moving of one or more foreground objects by target snapping; retrieving one or more objects in the 'foreground' into the 'background' and one or more objects in the 'background' into the 'foreground' based on a common property of the objects; and repeating these steps until one or more criteria is met.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; computer assisted retrieving of one or more objects in the 'foreground' into the 'background' and one or more objects in the 'background' into the 'foreground' based on a common property of the objects; and repeating these steps until one or more criteria is met.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; retrieving one or more objects in the 'foreground' into the 'background' and one or more objects in the 'background' into the 'foreground' based on relevance score and a 'groups' aggregate information; and repeating these steps until one or more criteria is met.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; retrieving one or more objects in the 'foreground' into a 'previously-retrieved layer group' and one or more objects in the 'background' into a 'retrieved layer group' based on the relevance score of the objects; and repeating these steps until one or more criteria is met.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; retrieving one or more objects in the 'foreground' into the 'background' and one or more objects in the 'background' into the 'foreground' based on a common property of the objects; and repeating these steps until no new objects were retrieved into the 'foreground'.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; calculating a relevance score for one or more objects in the plural objects; calculating an aggregate information for the plural 'groups' based on the plural relevance scores through a query of metadata associated with each object; retrieving one or more objects in the 'foreground' into the 'background' and one or more objects in the 'background' into the 'foreground' based on one or both the relevance score of the objects and the 'groups' aggregate information; and repeating these steps until one or more criteria is met.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; calculating a relevance score for one or more objects in the plural objects; calculating an aggregate information for the plural 'groups' based on the plural relevance scores through a query of metadata associated with each object, selected from the group consisting of time, location, similar labels, similar text, the presence of similar faces, the presence of similar people, a similar event, a similar location and other extracted information; retrieving one or more objects in the 'foreground' into the 'background' and one or more objects in the 'background' into the 'foreground' based on one or both the relevance score of the objects and the 'groups' aggregate information; and repeating these steps until one or more criteria is met.

In an embodiment of the invention, hand labeled photos constitute metadata.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; calculating a relevance score for one or more objects in the plural objects; calculating an aggregate information for the plural 'groups' based on the plural relevance scores through a query of metadata associated with each object; retrieving one or more objects in the 'foreground' into the 'background' and one or more objects in the 'background' into the 'foreground' based on the aggregate information of the objects in the 'group; and repeating these steps until one or more criteria is met.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects, wherein the movement is shown with a fluid animated display; retrieving one or more objects in the 'foreground' into the 'background' and one or more objects in the 'background' into the 'foreground' based on a common property of the objects; and repeating these steps until no new objects were retrieved into the 'foreground'.

In an embodiment of the invention, a fluid animated display is used in target snapping. In an embodiment of the invention, a fluid animated display is used to move objects in and out of the screen along the 'Z' axis.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing; moving one or more foreground objects; retrieving one or more objects in the 'foreground' into the 'background' and one or more objects in the 'background' into the 'foreground' based on a common property of the objects; and repeating these steps until no new objects were retrieved into the 'foreground' and further comprising manipulating the screen display wherein the manipulation is chosen from the group consisting of highlighting one or more groups of objects, printing one or more groups of objects and downloading an image of one or more groups of objects to a device.

In an embodiment of the present invention, a computer aided interactive method for organizing plural objects including files, notes, photographs, music files, and other media collections displayed on a large screen, wherein the plural objects are displayed in a group of foreground objects and a group of background objects comprising the steps of: visualizing one or more foreground objects through brushing, further comprises showing an objects relevance score, wherein the relevance score is indicated by one or both of size and transparency of the object; moving one or more foreground objects; retrieving one or more objects in the 'foreground' into the 'background' and one or more objects in the 'background' into the 'foreground' based on a common property of the objects; and repeating these steps until no new objects were retrieved into the 'foreground'.

In an embodiment of the present invention, a computer aided interactive method for organizing plural objects including files, notes, photographs, music files, and other media collections displayed on a screen, wherein the objects are organized in a three dimensional 'X-Y-Z' representation and the screen display is equivalent to a 'X-Y-plane' of an uppermost 'Z-direction', comprising the steps of: computer brushing of one or more objects in the 'X-Y-plane' of the uppermost 'Z-direction'; user moving of one or more objects in the 'X-Y-plane' of the uppermost 'Z-direction'; retrieving of one or more objects in the 'Z-direction' to the uppermost 'Z-direction' based on a common property of the objects; repeating until one or more criteria is met.

In an embodiment of the present invention, a computer aided interactive method for organizing plural objects including files, notes, photographs, music files, and other media collections displayed on a screen, wherein the objects are organized in a three dimensional 'X-Y-Z' representation and the screen display is equivalent to a 'X-Y-plane' of an uppermost 'Z-direction', comprising the steps of: computer brushing of one or more objects in the 'X-Y-plane' of the uppermost 'Z-direction'; user moving of one or more objects in the 'X-Y-plane' of the uppermost 'Z-direction'; retrieving of one or more objects in the 'Z-direction' to the uppermost 'Z-direction' based on a common property of the objects; repeating until one or more criteria is met; wherein the 'Z-direction' is represented on the screen by a feature selected from the group consisting of the size of the object and the transparency of the object.

In an embodiment of the present invention, a system for organizing plural objects including files, notes, photographs, music files, and other media collections displayed on a large screen, wherein the plural objects is displayed in a group of foreground objects and a group of background objects comprising the steps of: means for visualizing one or more foreground objects through brushing; means for moving one or more foreground objects; means for calculating a relevance score for one or more objects in the plural objects; means for calculating an aggregate information for the plural 'groups' based on the plural relevance scores; means for retrieving one or more objects in the 'foreground' into the 'background' and one or more objects in the 'background' into the 'foreground' based on one or both the relevance score of the objects and the 'groups' aggregate information; and repeating steps until one or more criteria is met.

In an embodiment of the present invention, a machine-readable medium having instructions stored thereon to cause a system to: visualize one or more foreground objects through brushing; move one or more foreground objects; calculate a relevance score for one or more objects in the plural objects; calculate an aggregate information for the plural 'groups' based on the plural relevance scores; retrieve one or more objects in the 'foreground' into the 'background' and one or more objects in the 'background' into the 'foreground' based on one or both the relevance score of the objects and the 'groups' aggregate information; and repeating steps until one or more criteria is met.

What is claimed is:

1. A computer aided interactive method for organizing a plurality of objects including files, notes, photographs, music files, and other media collections displayed on a large screen, wherein the plurality of objects are displayed in a group of foreground objects and a group of background objects comprising the steps of:
   (a) visualizing one or more foreground objects through implicit brushing wherein the implicit brushing is a side effect of grouping;

(b) moving one or more foreground objects, wherein moving one or more foreground objects involves computer assisted moving of two or more objects by target snapping, wherein target snapping applies arrows of the same color to objects sharing a common property, wherein the arrow on each of the objects points to other objects sharing the common property;

(c) retrieving one or more objects in the 'foreground' into the 'background' and one or more objects in the 'background' into the 'foreground' based on a common property of the objects; and (d) repeating steps (a) to (c) until one or more criteria is met.

2. The method of claim 1, wherein step (a) involves computer assisted visualizing of objects.

3. The method of claim 1, wherein brushing involves placing at least one decoration on at least two objects based on a common property of two or more foreground objects, wherein the decoration is one or both of an arrow that points to other objects sharing the common property and a colored border.

4. The method of claim 3, wherein step (b) involves user interaction with at least one decoration of at least one object.

5. The method of claim 1, wherein step (b) involves user interactive moving of objects.

6. The method of claim 1, wherein step (b) involves computer assisted moving of objects by target snapping, wherein target snapping applies borders of the same color to objects sharing a common property.

7. The method of claim 1, wherein step (c) involves computer assisted retrieving of objects.

8. The method of claim 1, where in step (c) the common property was one or both of a relevance score and a 'groups' aggregate information.

9. The method of claim 1, wherein step (c) further comprises retrieving one or more objects in the 'foreground' into a 'previously-retrieved layer' and one or more objects in the 'background' into a 'retrieved layer' based on the relevance score of the objects.

10. A computer aided interactive method for organizing a plurality of objects including files, notes, photographs, music files, and other media collections displayed on a large screen, wherein the plurality of objects are displayed in a group of foreground objects and a group of background objects comprising the steps of:

(a) selecting one or more objects in the 'foreground';

(b) visualizing one or more foreground objects through brushing;

(c) computer assisted moving of two or more foreground objects by target snapping, wherein target snapping applies arrows of the same color to objects sharing a common property, wherein a common property includes meta data of object, storage location of object, response to a predetermined attribute inquiry and response to a user attribute inquiry, wherein the arrow on each of the objects points to other objects sharing the common property;

(d) calculating a relevance score for one or more objects in the plurality of objects;

(e) calculating an aggregate information for the plurality of 'groups' based on the plurality of relevance scores;

(f) retrieving one or more objects in the 'foreground' into the 'background' and one or more objects in the 'background' into the 'foreground' based on one or both the relevance score of the objects and the 'groups' aggregate information; and (g) repeating steps (b) to (f) until one or more criteria is met.

11. The method of claim 10, where in step (d) an objects relevance score is calculated based on a query of metadata.

12. The method of claim 11, wherein the metadata is selected from the group consisting of time, location, similar labels, similar text, the presence of similar faces, the presence of similar people, a similar event, a similar location and other extracted information.

13. The method of claim 10, where in step (f) is based on the aggregate information of the objects in the 'group'.

14. The method of claim 10, wherein one or both of step (c) and step (f) is shown with a fluid animated display.

15. The method of claim 10, further comprising manipulating the screen display wherein the manipulation is chosen from the group consisting of highlighting one or more groups of objects, printing one or more groups of objects and downloading an image of one or more groups of objects to a device.

16. The method of claim 10, wherein step (b) further comprises showing an objects relevance score; wherein the relevance score is indicated on the large screen by one or both of size and transparency of the object.

17. A computer aided interactive method for organizing a plurality of objects including files, notes, photographs, music files, and other media collections displayed on a screen, wherein the objects are organized in a three dimensional 'X-Y-Z' representation and the screen display is equivalent to a 'X-Y-plane' of an uppermost 'Z-direction', comprising the steps of:

(a) computer brushing of one or more objects in the 'X-Y-plane' of the uppermost 'Z-direction';

(b) user moving of one or more objects in the 'X-Y-plane' of the uppermost 'Z-direction';

(c) retrieving of one or more objects in the 'Z-direction' to the uppermost 'Z-direction' based on a common property of the objects;

(d) repeating steps (a) to (c) until one or more criteria is met; and wherein ster (b) involves computer assisted moving of two or more objects by target snapping, wherein target snapping applies arrows of the same color to objects sharing a common property, wherein the arrow on each of the objects points to other objects sharing the common property.

18. The method of claim 17, wherein the 'Z-direction' is represented on the screen by one or both of the size of the object and the transparency of the object.

19. A system for organizing a plurality of objects including files, notes, photographs, music files, and other media collections displayed on a large screen, wherein the plurality of objects is displayed in a group of foreground objects and a group of background objects comprising the steps of:

(a) means for visualizing one or more foreground objects through brushing, wherein brushing involves placing at least one decoration on at least two objects based on a common property of two or more foreground objects, wherein a common property includes meta data of object, storage location of object, response to a predetermined attribute inquiry and response to a user attribute inquiry, wherein the decoration is one or both of an arrow that points to other objects sharing the common property and a colored border;

(b) means for moving one or more foreground objects;

(c) means for calculating a relevance score for one or more objects in the plurality of objects;

(d) means for calculating an aggregate information for the plurality of 'groups' based on the plurality of relevance scores;

(e) means for retrieving one or more objects in the 'foreground' into the 'background' and one or more objects in the 'background' into the 'foreground' based on one or both the relevance score of the objects and the 'groups' aggregate information; and (f) repeating steps (a) to (e) until one or more criteria is met.

20. A computer storage medium having instructions stored thereon to cause a system to:

(a) visualize one or more foreground objects through brushing;

(b) move one or more foreground objects by target snapping, wherein target snapping applies borders of the same color to objects sharing a common property, wherein a common property includes meta data of object, storage location of object, response to a predetermined attribute inquiry and response to a user attribute inquiry;

(c) calculate a relevance score for one or more objects in the plurality of objects;

(d) calculate an aggregate information for the plurality of 'groups' based on the plurality of relevance scores;

(e) retrieve one or more objects in the 'foreground' into the 'background' and one or more objects in the 'background' into the 'foreground' based on one or both the relevance score of the objects and the 'groups' aggregate information; and (f) repeat steps (a) to (e) until one or more criteria is met.

* * * * *